US008219145B2

(12) United States Patent  
Filipovic et al.

(10) Patent No.: US 8,219,145 B2
(45) Date of Patent: Jul. 10, 2012

(54) UNIVERSAL RADIO CARD FOR WIRELESS DEVICES

(75) Inventors: Zlatko Aurelio Filipovic, Palo Alto, CA (US); Adam James Wang, Palo Alto, CA (US); Brian Michael Wang, Palo Alto, CA (US)

(73) Assignee: Micro Mobio Corporation, Palo Alto, CA (US)

( * ) Notice: Subject to any disclaimer, the term of this patent is extended or adjusted under 35 U.S.C. 154(b) by 427 days.

(21) Appl. No.: 12/553,631

(22) Filed: Sep. 3, 2009

(65) Prior Publication Data

US 2011/0053637 A1  Mar. 3, 2011

(51) Int. Cl.
*H04B 1/38* (2006.01)
(52) U.S. Cl. .... 455/557; 455/87; 455/168.1; 455/552.1; 455/556.1; 455/558
(58) Field of Classification Search .......... 455/84, 455/87, 550.1, 552.1, 558, 127.1, 127.2, 455/127.4, 168.1; 445/84–87, 550.1, 552.1, 445/553.1, 554.2, 555, 556.1, 557–559, 120–126, 445/127.1, 127.2, 127.3, 127.4, 129, 136–144, 445/168.1, 170.1, 172.1
See application file for complete search history.

(56) References Cited

U.S. PATENT DOCUMENTS

| | | |
|---|---|---|
| 4,977,041 A | 12/1990 | Shiozawa |
| 5,656,972 A | 8/1997 | Norimatsu |
| 5,880,635 A | 3/1999 | Satoh |
| 6,025,651 A | 2/2000 | Nam |
| 6,151,509 A | 11/2000 | Chorey |
| 6,262,630 B1 | 7/2001 | Eriksson |
| 6,462,622 B1 | 10/2002 | Mori |
| 6,625,050 B2 | 9/2003 | Suwa |
| 6,678,506 B1 | 1/2004 | Dolman |
| 6,798,287 B2 | 9/2004 | Wu |
| 7,107,033 B2 * | 9/2006 | du Toit .......................... 455/296 |
| 7,283,504 B1 * | 10/2007 | Elliott .......................... 370/338 |
| 7,319,870 B2 * | 1/2008 | Olson et al. ................ 455/432.1 |
| 7,764,125 B2 * | 7/2010 | Dawe ........................... 330/305 |
| 2004/0090267 A1 * | 5/2004 | Nagamori et al. ............ 330/133 |
| 2004/0127185 A1 | 7/2004 | Abrahams |
| 2004/0203552 A1 | 10/2004 | Horiuchi |
| 2005/0239415 A1 | 10/2005 | Sagae |
| 2006/0079284 A1 * | 4/2006 | Lu et al. ....................... 455/558 |
| 2006/0158253 A1 * | 7/2006 | Ichitsubo et al. ............. 330/126 |
| 2006/0170492 A1 * | 8/2006 | Sheng-Fuh et al. ........... 330/129 |
| 2007/0042802 A1 * | 2/2007 | Park et al. ................... 455/552.1 |
| 2007/0105496 A1 * | 5/2007 | Bonta et al. .................. 455/13.1 |
| 2007/0281652 A1 * | 12/2007 | Tanaka et al. ................. 455/260 |
| 2008/0024225 A1 * | 1/2008 | Tsutsui et al. ................ 330/278 |
| 2008/0129403 A1 * | 6/2008 | Jang et al. .................... 331/181 |
| 2008/0136559 A1 * | 6/2008 | Takahashi et al. ............ 333/167 |
| 2008/0300009 A1 * | 12/2008 | Quinn et al. ................ 455/553.1 |
| 2008/0305756 A1 * | 12/2008 | Kuriyama et al. .......... 455/127.2 |
| 2009/0156129 A1 * | 6/2009 | Hassan et al. ................ 455/66.1 |
| 2009/0257208 A1 * | 10/2009 | Filipovic et al. .............. 361/760 |
| 2009/0298440 A1 * | 12/2009 | Takeya et al. .............. 455/67.14 |

(Continued)

*Primary Examiner* — Meless N Zewdu
*Assistant Examiner* — Magdi Elhag
(74) *Attorney, Agent, or Firm* — SV Patent Service

(57) ABSTRACT

A multi-band wireless system includes a wireless device and a detachable radio card. The wireless device includes an application processor, an electric interface, and an antenna. The detachable radio card can be mounted onto the electric interface. The detachable radio card includes a base band processor, a radio-frequency transceiver, a multi-band power amplifier module, and a radio controller.

25 Claims, 10 Drawing Sheets

U.S. PATENT DOCUMENTS

2010/0029326 A1* 2/2010 Bergstrom et al. ........ 455/556.1
2010/0109778 A1* 5/2010 Ichitsubo et al. ............ 330/285
2010/0124920 A1* 5/2010 Feher ........................ 455/426.1

* cited by examiner

UNIVERSAL RADIO CARD FOR WIRELESS DEVICES

BACKGROUND

The present invention relates to wireless device suitable for multiple wireless standards and protocols.

Portable devices such as laptop personal computers, personal digital assistants (PDA), mobile internet devices (MID), cellular phones, and smart phones with wireless data communication capability are being developed in ever increasing functions and features for convenience access to the Internet and other data ports. The existence of different wireless standards in the world, however, prevents one wireless device to be used across all regions of the world. For example, cellular phones can operate understand standards such as CDMA, WCDMA, GSM, WiMax, LTE, IMT-2000, WiBro, and WiFi. Different wireless standards also can operate in different frequency bands and thus require different hardware components. Different wireless standards also include different software algorithms for signal encoding and decoding. As a result, the current mobile devices are designed to operate under a specific wireless standard adopted in a specific region of the world.

Referring to FIG. 1, a conventional cellular phone 100 can include a power amplifier 110, an antenna 120 for transmitting radio frequency (RF) signals output from the power amplifier 110, a Tx/Rx switch 120 for controlling the transmission and reception of the RF signals, an RF transceiver 130 for up and down convert between the modulated signals and RF signals, a memory 150, a base band processor 160 for processing digital signals, and an application processor 170. The base band processor 160 and the application processor 170 can be implemented by software in a general processor such as a central processor unit. These components are typically implemented as integrated circuits (IC) on separate semiconductor chips that are mounted on a printer circuit board (PCB). The different components are connected by a control and data bus 180 on the PCB board. The base band processor 130 and the application processor 170 are designed to encode and decode digital signals for the intended wireless standard. The power amplifier 110 and the transceiver 160 are optimized to operate in the frequency band(s) defined in the intended wireless standard.

In view of the above discussions, a need still exists for a flexible wireless device that can be used for different wireless standards across different frequency bands throughout the world.

SUMMARY

In a general aspect, the present invention relates to a multi-band wireless system that includes a wireless device that can include an application processor that can output a data signal; an electric interface in communication with the application processor; and an antenna that can transmit a wireless signal comprising a first amplified RF signal. The multi-band wireless system also includes a detachable radio card that can be mounted in contact with the electric interface. The detachable radio card can include a base band processor that can receive the data signal via the electric interface from the application processor and to output a modulated signal; a radio-frequency (RF) transceiver that can receive the modulated signal and output a first RF signal in a first frequency band or a second frequency band; a multi-band power amplifier module that can amplify the first RF signal and to produce the first amplified RF signal in the first frequency band or the second frequency band; and a radio controller that can control the RF transceiver and the multi-band power amplifier module to select the first frequency band or the second frequency band.

In another general aspect, the present invention relates to a multi-band wireless system that includes a wireless device and a detachable radio card. The wireless device can include an application processor that can output a data signal; an electric interface in communication with the application processor; and an antenna that can transmit a wireless signal comprising a first amplified RF signal. The detachable radio card can be mounted in contact with the electric interface. The detachable radio card can include a base band processor that can receive the data signal via the electric interface from the application processor and to output a modulated signal; a radio-frequency (RF) transceiver that can receive the modulated signal and output a first RF signal in a first frequency band or a second frequency band; a multi-band power amplifier module that can amplify the first RF signal and to produce the first amplified RF signal in the first frequency band or the second frequency band; a multi-band filter comprising a first selectable narrow-band filter and a second selectable narrow-band filter, wherein the first selectable narrow-band filter can pass the first amplified RF signal in the first frequency RF band, wherein the second selectable narrow-band filter can pass the second amplified RF signal in the second frequency RF band; and a radio controller that can control the RF transceiver, the multi-band power amplifier module, and the multi-band filter to select the first frequency band or the second frequency band.

In yet another general aspect, the present invention relates to a multi-band wireless system that includes a wireless device and a detachable radio card. The wireless device can include an application processor that can output a data signal; and a first antenna that can transmit a short-range wireless signal in response to the data signal. The radio card can include a second antenna that can receive the short-range wireless signal; a base band processor in communication with the second antenna, the base band processor being that can output a modulated signal in response to the data signal extracted from the short-range wireless signal; a radio-frequency (RF) transceiver that can output a first RF signal in a first frequency band or a second frequency band in response to the modulated signal; a multi-band power amplifier module that can amplify the first RF signal and to produce a first amplified RF signal in the first frequency band or the second frequency band; a radio controller that can control the RF transceiver and the multi-band power amplifier module to select the first frequency band or the second frequency band; and a third antenna that can transmit a wide-range wireless signal comprising the first amplified RF signal.

Implementations of the system may include one or more of the following. The wireless device can further include a sensor in communication with the application processor, wherein the sensor can detect one or more of motion, acceleration, temperature, pressure, fluid-level, flow, position, proximity, rotation, stress/strain, vibration, chemical analysis, electric and magnetic field, electric current, voltage, capacitance, piezoelectricity, magneto-resistance, an optical signal, infrared photons, laser signals, a photonic signal, or an ultrasound signal. The wireless device can include a controller that can control a switch, a motor, or an actuator. The wireless device can further include a controller in communication with the application processor, wherein the controller is configured to control a switch, a motor, or an actuator. The wireless device can further include an input/output controller in communication with the application processor, wherein the input/output controller is configured to control data input by a user and output to a user. The wireless device can further include a display controller driver in communication with the application processor, wherein the display controller driver is configured to enable a display to be viewed by a user. The detachable radio card can be compatible with the format of MicroSD card. The detachable radio card can be compatible with the format of a Subscriber Identity Module (SIM) or Universal Integrated Circuit Card (UICC). The detachable radio card can further include a multi-band filter comprising a first selectable narrow-band filter and a second selectable narrow-band filter, wherein the first selectable narrow-band filter is configured to pass the first amplified RF signal in the first frequency RF band, wherein the second selectable narrow-band filter is configured to pass the second amplified RF signal in the second frequency RF band. The multi-band filter can switch turn on one of the first selectable narrow-band filter or the second selectable narrow-band filter under the control of the radio controller. The first frequency band and the second frequency band can be defined by a wireless standard comprising Universal Mobile Telecommunications System (UMTS), WiMax, WiBro, WiFi, LTE, or IMT-2000. The multi-band power amplifier module in the detachable radio card can include a power amplifier circuit configured to output the first amplified RF signal in response to a first biasing signal, a sensing circuit configured to sense at least one of a power, a gain, or a phase of the first amplified RF signal and to produce a sensing signal to be received by the radio controller, a first biasing circuit configured to produce the first bias signal under the control of the radio controller, and a control circuit under the control of the radio controller and configured to control gain variation or phase variation over a predetermined power range of the first amplified RF signal.

The disclosed systems and methods provide a flexible wireless device usable under different wireless communication standards in different regions of the world. During an international trip, a user does not need to purchase and carry multiple wireless devices, which is more convenient and saves cost for the user. The integration of hardware and software on a detachable universal radio card allows the disclosed wireless device to operate in a wide range of radio frequency bands used in different wireless communication protocols.

BRIEF DESCRIPTION OF THE DRAWINGS

The following drawings, which are incorporated in and from a part of the specification, illustrate embodiments of the present specification and, together with the description, serve to explain the principles of the specification.

DETAILED DESCRIPTION

Figure 1:
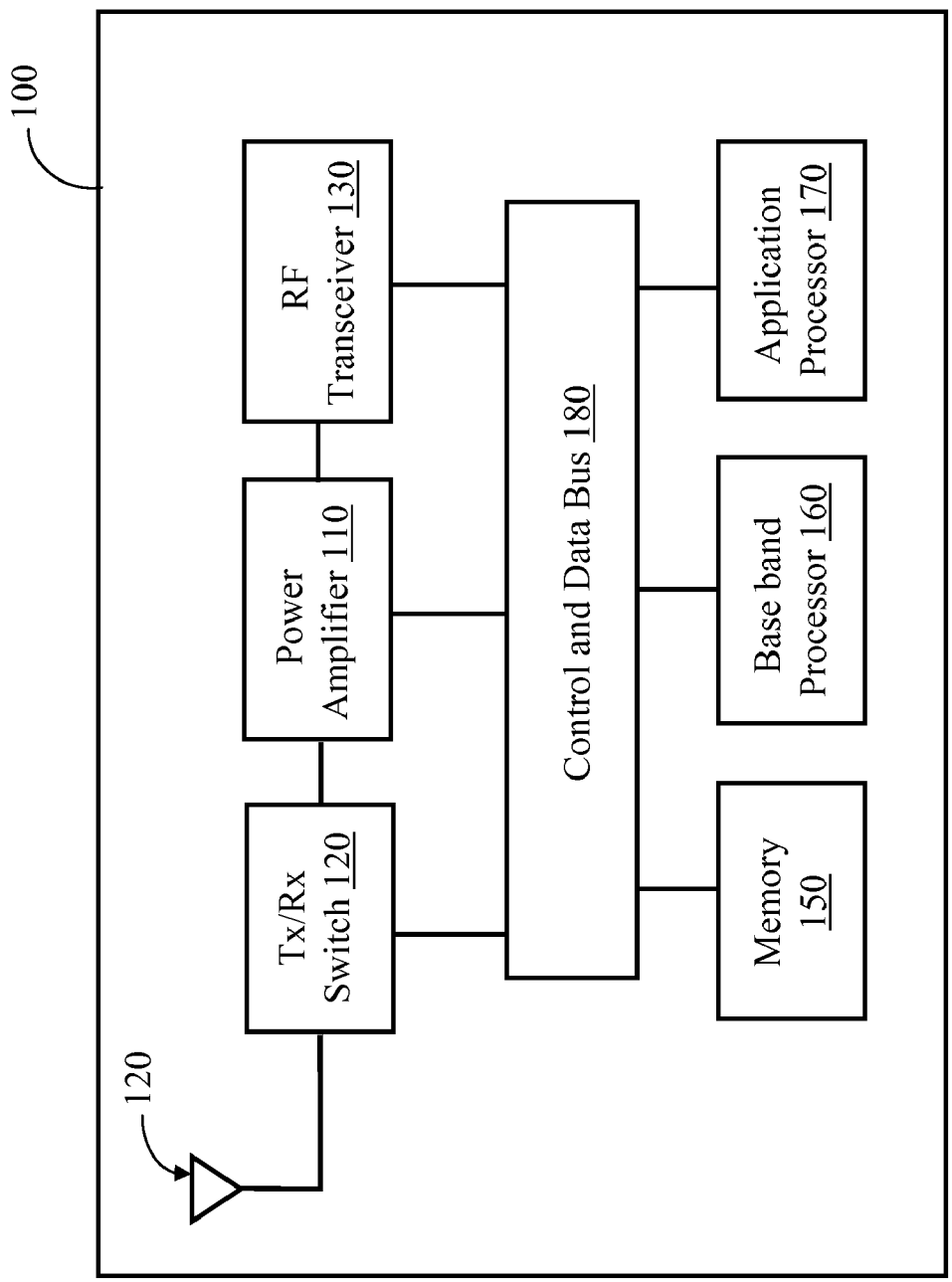
FIG. 1 is a block diagram for a conventional wireless device.
Figure 2:
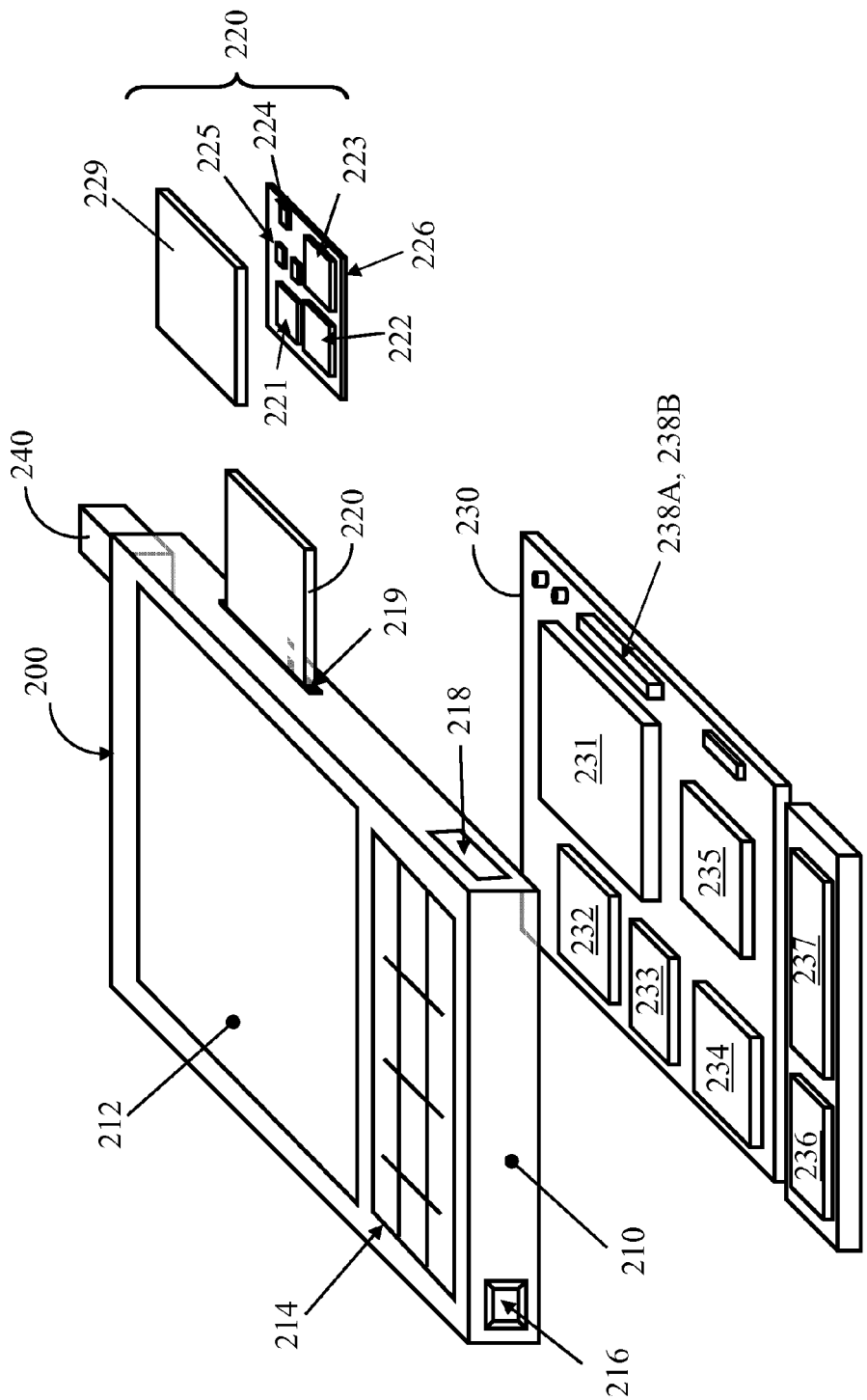
FIG. 2 is a perspective view of a wireless communication device compatible with a universal radio card in accordance with the present invention.
Figure 3:
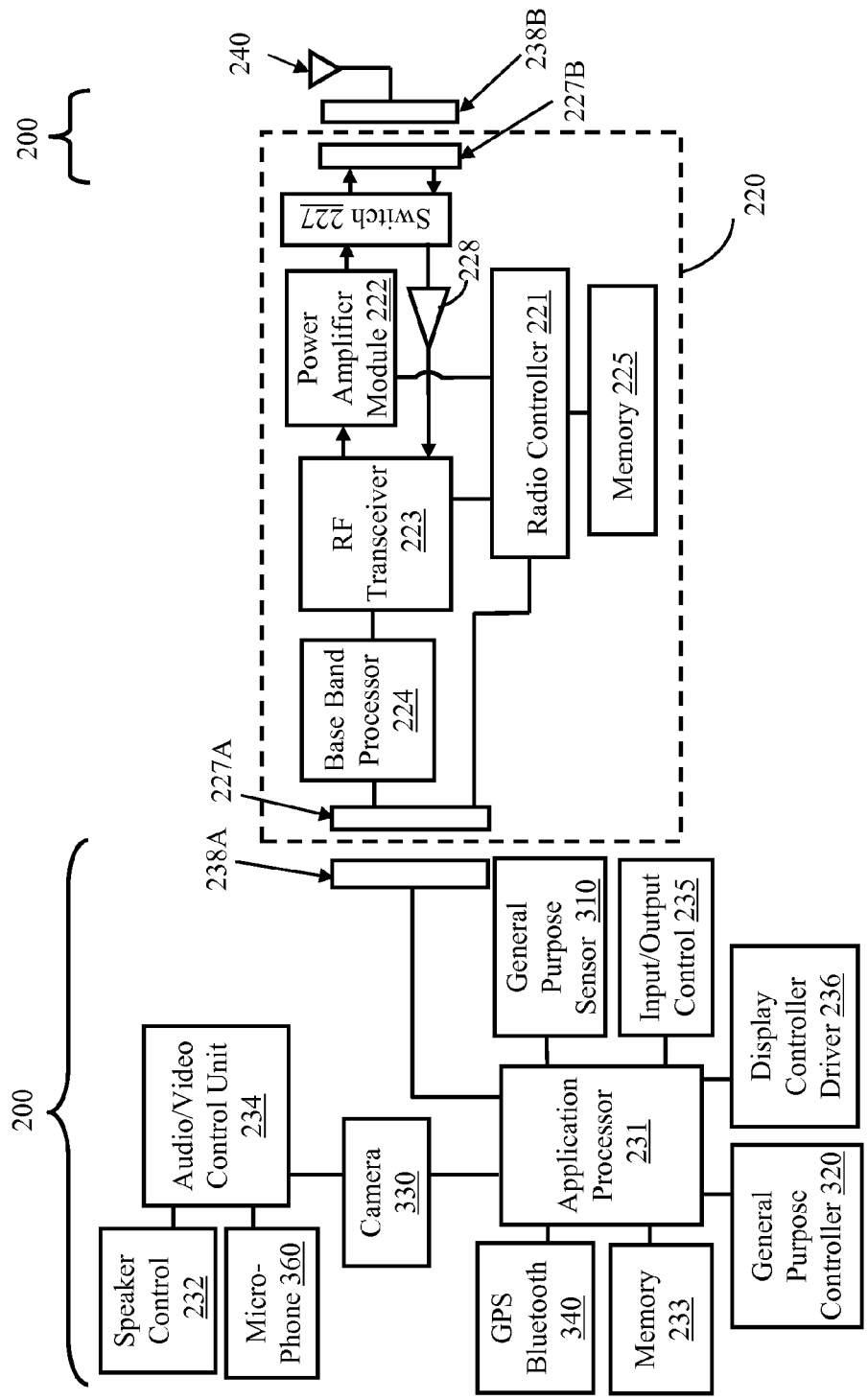
FIG. 3 is a detailed functional diagram for a wireless device and an associated universal radio card in accordance with the present invention.

Referring to FIGS. 2 and 3, a wireless device 200 in conjunction with a universal radio card 220 are capable of multi-band wireless communications under a wide range of wireless standards. The wireless device 200 includes a housing member 210, a display 212, an input/output interface 214 (such as a key pad or touch screen input), a power charge connector 216, and a USB (Universal Serial Bus) port 218. Although not shown, the wireless device 200 can also include circuitry and interfaces for infrared or Bluetooth communications. The wireless device can be, for example, a cellular phone, a PDA, or other mobile transmitting and reception devices.

The wireless device 200 also includes a card slot 219 configured to receive the universal radio card 220. The universal radio card 220 includes, on a card circuit board 226, a radio controller 221, a power amplifier module 222, an RF transceiver 223, a base band processor 224, a memory 225, and a switch (or duplexer) 227 for switch between the transmission and the reception path. The universal radio card 220 can be plugged into the card slot 219. The universal radio card 230 can include interfaces 227A and 227B, and a casing member 229. The universal radio card 220 is in general detachable from the wireless device 200; it may or may not involve a card slot.

In some embodiments, the RF transceiver 223 and the base band processor 224 can be fabricated on a single IC chip in the universal radio card 220. In some embodiments, the base band processor 224 can be disposed in the wireless device 200 instead of in the universal radio card 220.

The wireless device 200 also includes one or more host circuit board(s) 230 and an antenna 240. An application processor 231, a memory 233, an audio/video control unit 234, an input/output control 235 to control data input by a user and output to a user, a display controller/driver 236 configured to enable a display to be viewed by a user, a power control unit 237 mounted on the host circuit board 230. An interface 238A is configured to connect to the interface 227A, which allows communications between the base band processor 224 on the universal radio card 220 and the application processor 231 on the wireless device 200. The application processor 231 is configured to output data to be wirelessly transmitted by the universal radio card 220. Such data includes web access request, voice data, sensing data (obtained by the general purpose sensor 310 etc), control data, and real-time communication data. The base band processor 224 can modulate the data signal received from the application processor 231. An interface 238B is configured to connect to the interface 227B, which allows the power amplifier module 222 on the universal radio card 220 to send the amplified RF signal to the antenna 240. The interfaces 238A, 238B and 227A and 227B can be implemented as socket connectors, connector terminals, etc. In the reception path, a low-noise amplifier 228 can be provided for amplifying reception RF signals when the switch (or duplexer) 227 is switched to reception mode.

The one or more host circuit board(s) 230 can also include any or all of a general purpose sensor 310, a general purpose controller 320, a camera 330, and a GPS and Bluetooth control unit 340, which are coupled to the application processor 231, and a speaker control unit 232 and microphone control unit 360 coupled to the audio/video control unit 234. The general purpose sensor 310 can detect one or more of motion or acceleration of the wireless device, temperature, pressure, optical, fluid-level, flow, position, proximity, rotation, stress/strain, vibration, chemical analysis, electric and magnetic field, electric current, voltage, capacitance, piezoelectricity, magneto-resistance, an optical signal, infrared photons, laser signals, a photonic signal, an ultrasound signal, health monitoring signal, physiological sensing signal, and other signals from medical devices, etc. The general purpose controller 320 can control mechanical, electrical and optical switches, motors, and actuators. Some or all of the general purpose sensor 310 and the general purpose controller 320 can be positioned outside of the housing member 210 of the wireless device 200. For example, a temperature sensor may be placed in the ambient environment with a wire extension to the housing member 210 of the wireless device 200.

Figure 4:
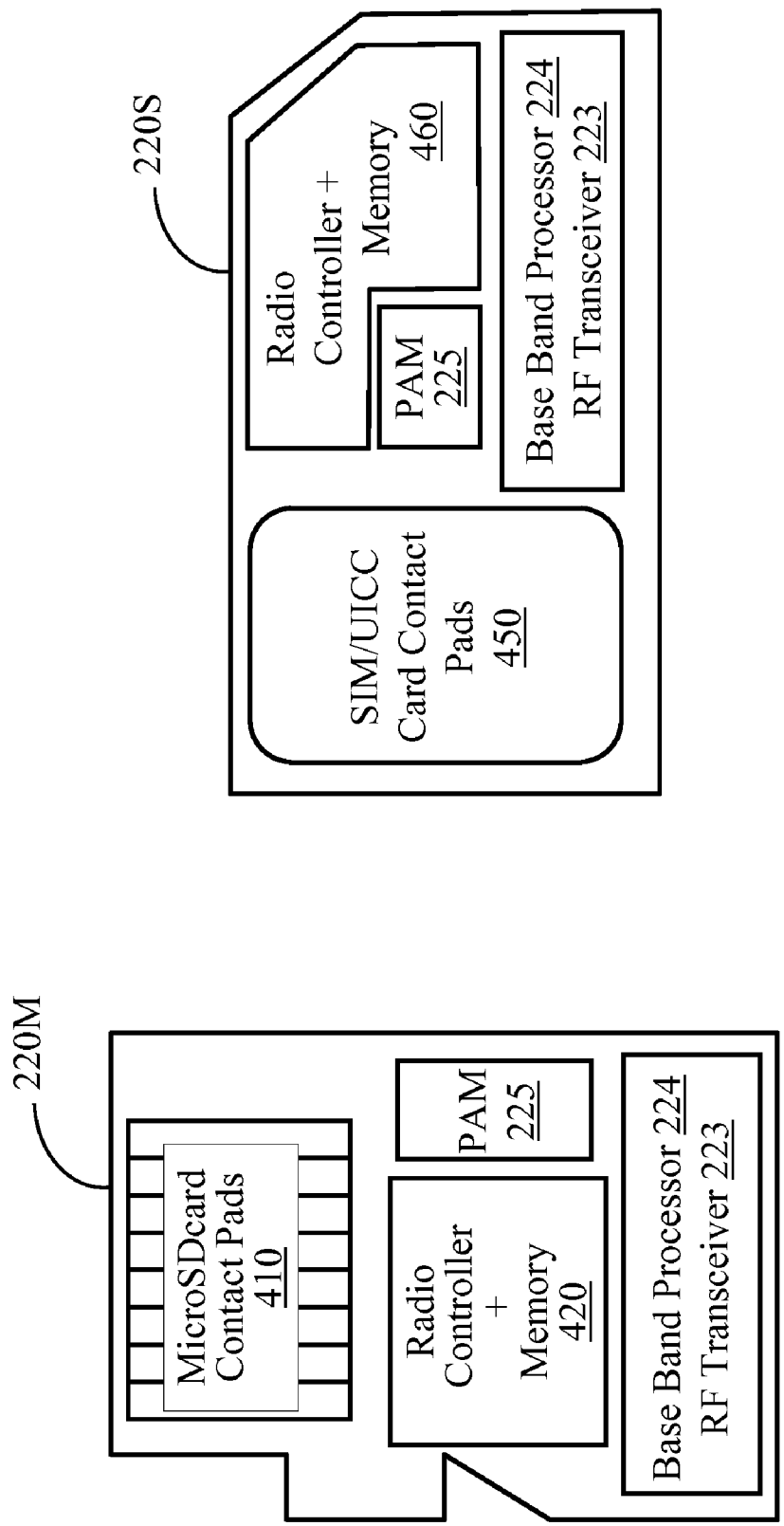
FIG. 4A illustrates the layout of a universal radio card compatible with MicroSD card.
FIG. 4B illustrates the layout of a universal radio card compatible with Subscriber Identity Module (SIM) or Universal Integrated Circuit Card (UICC) format.

The universal radio card 220 and its associated interfaces 227A, 227B can be compatible with standard formats for flash memory card such as Micro SD, Mini SD, micro USB, etc. A universal radio card 220M, as shown in FIG. 4A, can be compatible with Micro SD format including contact pads 410 as defined by Micro SD and a combined radio controller and memory unit 420. The RF transceiver 223 and the base band processor 224 can be combined on a single IC chip. The RF transceiver 223 can up-convert the modulated signals from the base-band processor 224 to an RF signal in the transmission path, and demodulate RF signals received by the antenna 240 and amplified in the reception path. Another universal radio card 220S, as shown in FIG. 4B, can be compatible with Subscriber Identity Module (SIM)/Universal integrated circuit card (UICC) card format, which includes contact pads 450 as defined by SIM card and its next generation UICC format and a combined radio controller and memory unit 460.

In one aspect, the present application discloses a universal radio card that includes hardware modifications such as power amplifiers and RF transceivers, which are needed for operations under different wireless standards. The software modifications for different wireless standards are partially stored and executed on the radio controller on the universal radio card, and partially executed by algorithms in the base band processor and the application processor and stored in the memory on the host wireless device of the multi-band wireless system.

Figure 5:
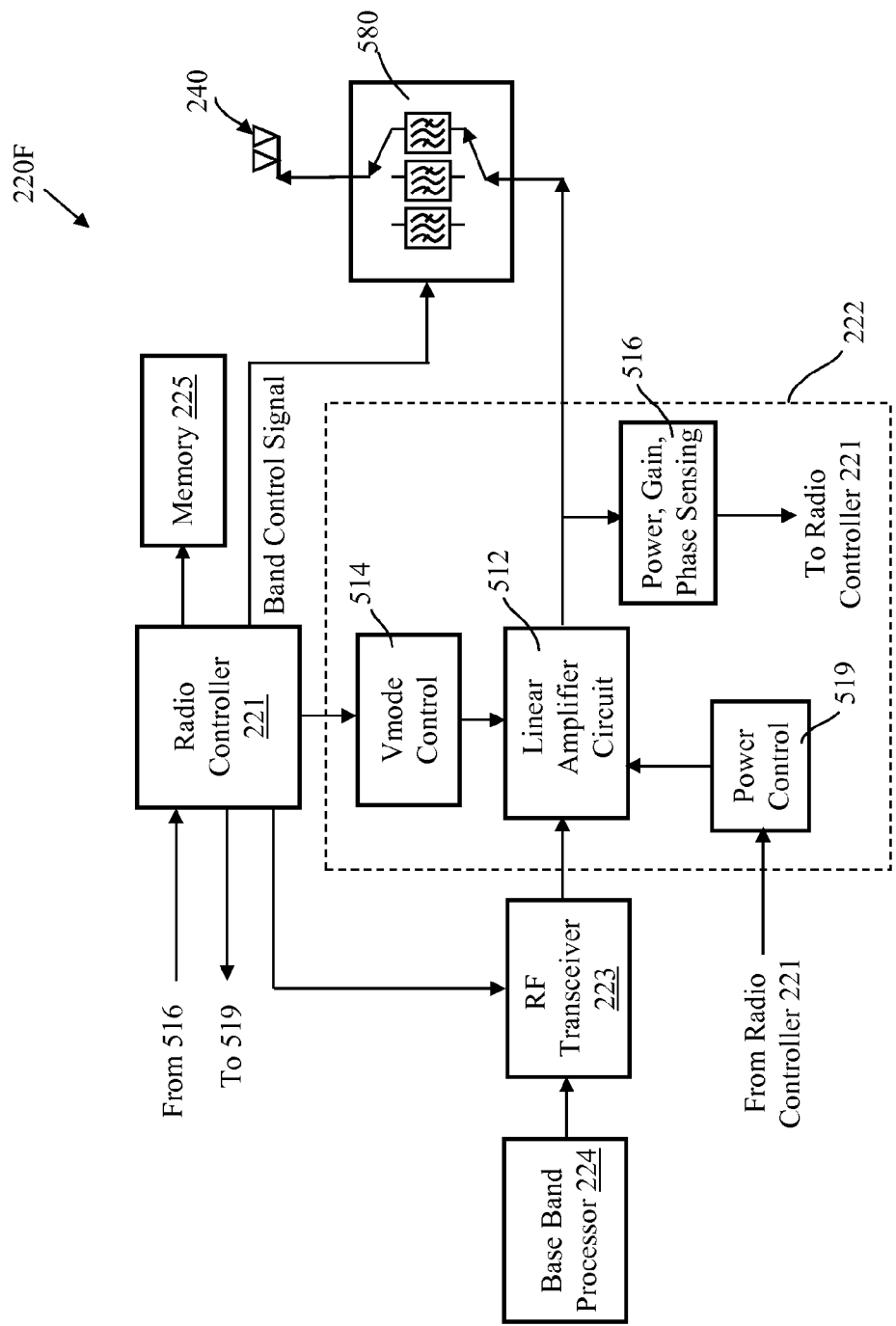
FIG. 5 is a detailed functional diagram for an exemplified universal radio card in accordance with the present invention.

Referring to FIG. 5, an exemplified universal radio card 220F includes a radio controller 221, a power amplifier module 222, an RF transceiver 223, and a memory 225. The power amplifier (PA) module 222 includes a multi-band linear amplifier circuit 512, a Vmode control circuit 514, a power control circuit 519, and a sensing circuit 516 for detecting the power, the gain, and the phase of the output signal from multi-band linear amplifier circuit 512. The radio controller 221 can include a linearity controller that provides control signals to the gain control circuit (625 in FIG. 6) and the phase control circuit (627 in FIG. 6). The power amplifier module 222 can therefore amplify input RF signals by via close-loop control. In some embodiments, the power amplifier module 222 is fabricated on an integrated circuit (IC) module that can be implemented on a single semiconductor chip.

The base band processor 224 is configured to generate modulated signals in response to input digital signals. The input digital signals are to be transmitted in different single RF bands in a broad band. The frequencies of the modulated signals are up-converted by the RF transceiver 223 to RF signals suitable for wireless transmission. The RF signal is amplified by the multi-band linear amplifier circuit 512 that produces amplified RF signal for transmission by the antenna 240. The multi-band linear amplifier circuit 512 can be turned ON/OFF by the power control signal produced by the power control circuit 519. The multi-band linear amplifier circuit 512 also includes a low-noise amplifier 228 for amplifying reception RF signals.

Figure 6:
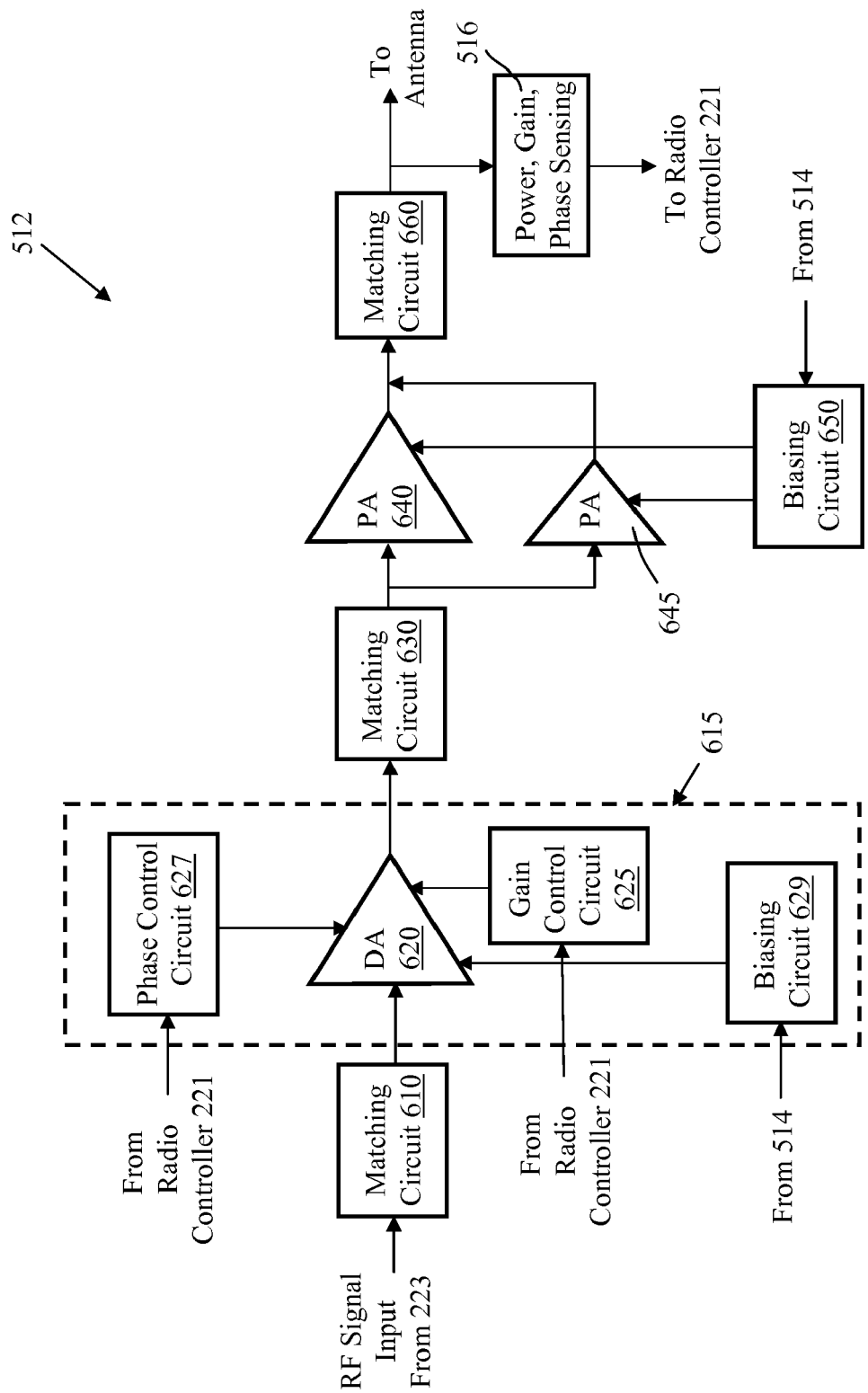
FIG. 6 is a functional diagram for an exemplified multi-band linear amplifier circuit compatible with the universal radio card shown in FIG. 5.

Referring to FIG. 6, the multi-band linear amplifier circuit 512 can include a matching circuit 610 for the input signal and a power driving stage 615 that includes a driver amplifier 620, a gain control circuit 625, and a phase control circuit 627. The gain control circuit 625 and the phase control circuit 627 receive control signals from the radio controller 221 in accordance to the requirements of different wireless protocols. The gain control circuit 625 and the phase control circuit 627 can respectively provide gain and phase controls to the driver amplifier 620. The driver amplifier 620 is biased by a biasing circuit 229 that can be internal in the driver amplifier 620. The multi-band linear amplifier circuit 512 also includes a matching circuit 630 for a first amplified signal from the driver amplifier 620, and a matching circuit 660 for the output signal. A sensing circuit 516 can receive the output signal from the matching circuit 260, which can detect the power, the gain, and the phase of the output signal for linearity control.

The multi-band linear amplifier circuit 512 can also include a main power amplifier 640 and an auxiliary power amplifier 645 which can be arranged in a parallel circuit. The gain control circuit 627 can improve gain linearity by compensating the gain expansion and compression between the driver amplifier 620 and the main power amplifier 640 and the auxiliary power amplifier 645. The phase control circuit 625 can correct or compensate for phase variations over a range of the output power.

A biasing circuit 650 can provide bias voltages the main power amplifier 640 and the auxiliary power amplifier 645. The biasing circuit 650 can produce a first bias signal for the main power amplifier 640 and a second bias signal for the auxiliary power amplifier 645. The main power amplifier 640 and the auxiliary power amplifier 645 can thus be activated separately to optimize the performances (power consumption, gain linearity, noise reduction, etc.) of the wireless communication device. The biasing circuit 650 can activate the main power amplifier 640 when the power of the output signal is to exceed a first threshold value. The biasing circuit 650 can deactivate the main power amplifier 640 when the power of the output signal is to be below a first threshold value. The auxiliary power amplifier 645 can be activated by the biasing circuit 650 at least when the power of the output signal is below a second threshold value. Optionally, the auxiliary power amplifier 645 can be activated by the biasing circuit 650 when the power of the output signal is to exceed the second threshold value. The first threshold value can be the substantially the same or below the second threshold value. The biasing circuit 650 can be controlled by a sensing signal in response to the output RF signal measured by a sensing circuit. The controls can also be determined by a radio controller 221 in accordance to the requirements of different wireless protocols.

The matching circuit 610 matches the input impedance of the driver amplifier 620. The driver amplifier 620 amplifies the input RF signal from the matching circuit 610 and sends a first amplified signal to the matching circuit 630. The matching circuit 630 matches the output impedance of the driver amplifier 620 and the input impedance of the power amplifier 640. The main power amplifier 640 and the auxiliary power amplifier 645, as described below, can coordinate the amplification tasks to produce amplified signals to be sent to the matching circuit 660. The matching circuit 660 can match the output impedance of the power amplifier 640 from the main power amplifier 640 and the auxiliary power amplifier 645 and produce an output signal. The impedance matching of the input and output signals is preferably based on the 50-ohm standard of the RF industry. Other details of impedance matching circuits are described commonly assigned U.S. patent application Ser. No. 10/041,863, filed on Oct. 22, 2001, titled "Multilayer RF Amplifier Module", by Wang, et al., the content of which is incorporated herein by reference.

In some embodiments, referring back to FIG. 5, the multi-band linear amplifier circuit 512 can be controlled by the radio controller 221 in an open loop via Vmode control circuit 514. The Vmode control circuit 514 can produce a Vmode control signal to control internal settings of the biasing circuits (e.g. 629 and 650 in FIG. 6) under the control of the radio controller 221. The radio controller 221 has the knowledge of the digital signal modulation type and the linear output requirement in different wireless protocols, which are stored in the memory 225. For example, when the device is transmitting at high power, the Vmode control signal can control the biasing circuit (650 in FIG. 6) to activate the main power amplifier 640. When the device is transmitting at low power, the Vmode control signal can control the biasing circuit to activate the auxiliary power amplifier 645. As a result, power consumption and output distortion can be minimized.

To provide excellent output linearity, a power amplifier must maintain a constant gain (i.e. the ratio of the output signal power level to the input signal power level) over a wide output range. However, the power amplifier can be driven close to saturation at high output power level, causing significant distortions in phase and gain in the output RF signal. The quality of digital communication, especially the quality degrades at high output power level, can commonly be measured by Error Vector Magnitude (EVM), Bit Error Rate (BER), Packet Error Rate (PER), and Adjacent Channel Power Ratio (ACPR).

In some embodiments, the multi-band linear amplifier circuit 512 can be controlled by a close loop by the sensing circuit 516. The output linearity can be improved by a feedback control based on the sensing of the output power level. The sensing circuit 516 can measure the power of the output RF signal and send a sensing signal to the radio controller 221. The radio controller 221 can set the transmission power level by varying the input signal to the RF transceiver 223 and thus to the PA module 222 in accordance to the sensing signal received by the sensing circuit 516. The radio controller 221 can process the power-sensing signal from the sensing circuit 516 and compute a quality or a magnitude of the output signal. A power-sensing control signal is then generated to control the biasing circuit 250 in response to the quality, or the magnitude, or a combination thereof, of the output signal, which can depend on the requirements of different wireless protocols. Other details of the power sensor circuit are disclosed in commonly assigned U.S. patent application Ser. No. 10/385,059 tilted "Accurate Power Sensing Circuit for Power Amplifiers" filed Mar. 9, 2003, by Ichitsubo et al., the disclosures of which related application are incorporated herein by reference.

The radio controller 221 can receive and process the power-sensing control signal, and output a processed power-sensing control signal to control the multi-band linear amplifier circuit 512. The processed power-sensing control signal can be a function of the quality and/or the magnitude of the amplified radio frequency signals from the multi-band linear amplifier circuit 512. The radio controller 221 can improve output linearity of the multi-band linear amplifier circuit 512 by adjusting the bias of the biasing circuits (e.g. 250) in accordance to the actual output power measured by the sensing circuit 516. It can reduce gain saturation and maintain a more constant gain, which can improve the output linearity in a wide power range. Furthermore, the quality of digital communication can also be improved by an external controller that can adjust the amplitude of the input RF signal based the known relationship between digital communication quality and output power level. The radio controller 221 can be a linearity controller that provides control signals to the gain control circuit 625 and the phase control circuit 627.

The universal radio card 220F can include a multi-band filter 580 that is configured to switch the output RF signals to different RF bands as defined in different wireless protocols. The band switching is controlled by a band control signal from the radio controller 221. The radio controller 221 can produce the band control signal in accordance the intended transmission single RF band of input digital signal. The radio controller 221 is configured to generate digital modulated signals for a single RF band and simultaneously switch the multi-band filter 580 to allow the RF output signals in that single RF band to pass to the antenna 240 for RF transmission. In some embodiments, the multi-band filter 580 can be disposed, instead of on the universal radio card 220F, in the host device between the interface 238 and the antenna 240.

The disclosed power amplifier module can be implemented as an integrated circuit on a common semiconductor substrate which can be a multiplayer printed circuit board (PCB), lead frame, lower-temperature co-fired ceramics (LTCC), or other suitable electronic materials. The substrate includes metal Pins adapted to receive connecting terminals of integrated circuits including the first stage power amplifier, the main and the auxiliary power amplifiers, the biasing circuit, sensing circuit, and one or more control circuits for linearity control to provide control signals (to the gain control circuit and phase control circuit ). The amplifier IC chip can include electrically conductive layers and patches for proper grounding and cooling of the power amplifier module.

The PA module provides a unitary or common component which may be conveniently assembled in a RF transmission device, with correspondingly simplified assembly, compact 3D size, and enhanced RF amplification performance. In accordance with the present invention, the term "module" refers to such a unitary device for wireless communications, comprising integrated power amplifiers and other circuitry and auxiliary electronic components. The disclosed PA module can be applicable to wide-range wireless devices such as cellular phone, mobile computers, and handheld wireless digital devices. A PA module typically has a miniature size of a few millimeters. Other details about power amplifier modules are disclosed in commonly assigned U.S. patent application Ser. No. 11/486,465 tilted "Thermally distributed integrated power amplifier module", filed Jul. 16, 2006, by Ichitsubo et al., the disclosure of which related application is incorporated herein by reference.

In the present specification, the term "broad band" is defined as an RF frequency band that spans the frequency range of at least two non-overlapping single RF bands as shown by one of the single UMTS-FDD RF Frequency Bands. It should be understood that the single RF band can also be defined by standards other than UMTS. A typical bandwidth for the disclosed broad band power amplifier can cover up to 100 MHz and wider. A single RF band alone typically has a bandwidth of 75 MHz or narrower. A broad band can have a bandwidth more than two times, three times, or five times of a bandwidth of a single RF band.

An advantageous feature of the improved and efficient multi-band linear amplifier circuit 512 is that the intermediate amplified RF signal from the driver amplifier 620 is impedance matched by the matching circuit 630 before it is received by the main power amplifier 640 and the auxiliary power amplifier 645. Since the main power amplifier 640 and the auxiliary power amplifier 645 can operate with high current flowing, non-zero impedance can induce can inject unwanted voltage noise during the intermediate amplification steps in the multi-band linear amplifier circuit. The impedance matching can therefore significantly minimize noise and unwanted signal oscillations.

The main power amplifier 640 or the auxiliary power amplifier 645 can include multiple stages of amplifiers. Moreover, the disclosed power amplifier module can include more than one auxiliary power amplifiers 645. For example, the disclosed power amplifier module can include two or three auxiliary power amplifiers that are connected in parallel with the main power amplifier. The different auxiliary power amplifiers can be activated at and below different threshold power levels of the output signal. For example, the power of the output signals may include three contiguous ranges that the main power amplifier and two auxiliary power amplifiers are responsible for amplifying from the high power rage to the low power range. In some embodiments, the disclosed power amplifier module is fabricated on an integrated circuit (IC) module that can be implemented on a single semiconductor chip.

The driver amplifier 620, the main power amplifier 640, and the auxiliary power amplifier 645, with the assistance with the gain control circuit 625, the phase control circuit 627, and the sensing circuit 516, can provide power amplification with excellent linearity in each of the single RF bands within a broad band. For example, the broad band can cover a frequency span ranging from 400 MHz to 6000 MHz, or a range from 698 MHz to 798 MHz. These exemplified single RF bands typically have their bandwidths narrower than 5% of their respective center frequencies. The broad band, which these single RF bands collectively reside in, can span a frequency range having a width more than 100% of its center frequency.

The main power amplifier 640 and the auxiliary power amplifier 645 can be fabricated and controlled in accordance to the probability distribution of the output power in wireless communication devices that incorporates the multi-band linear amplifier circuit 512. The probability for output power can be peaked at a certain output power value and falls off above and below the peak output power. The exact value of the peak output power and the shape of the fall-off curves depend on the wireless communication protocol as well as the geographic environment such as an urban area or a rural area.

The main power amplifier 640 can be fabricated in large dimensions such that it can handle the amplification of high power output. The auxiliary power amplifier 645 on the other hand can be fabricated in smaller dimensions to allow it to handle the amplification of low power signals. The main power amplifier 640 can be activated by the biasing circuit 650 when the output signal is at high power. The auxiliary power amplifier 645 can be activated by the biasing circuit 650 when the output signal is at low power. The output power, as described above and more in detail below, can be measured by a sensing circuit. The sensing signal produced by the sensing circuit can be directly fed to the radio controller 221 that can determine the proper control to biasing circuit and Vmode control based on the calculation of the power level and other quality factors of the output RF signal as required by different wireless protocols.

The auxiliary power amplifier 645 generally consumes much less power than the main power amplifier 640. Because the main power amplifier 640 can be turned off when the output power is at low level, the power consumption can be significantly decreased for the wireless communication device.

In accordance with the present specification, the main power amplifier 640 and the auxiliary power amplifier 645 can be fabricated to optimize power management performance specific to the geographic environment. For example, if a wireless device such as a cellular phone is to be used in the Asian market, the functionalities of the main power amplifier 640 and the auxiliary power amplifier 645 can be tailored to the specific probability distribution for output power in the Asian market. For example, if a geographic-market includes higher density of wireless transmission base stations which requires of lower output power from the user terminals, the main power amplifier can be tailored to smaller dimensions. The geographic markets can also include suburban versus urban applications. For example, the main power amplifier and the auxiliary power amplifier can be fabricated with a size ratio in a range between 1:1 and 100:1, such as approximately 7:1, which can cover power ranges differing by about 5 dB.

In some embodiments, the disclosed PA module and radio controller can improve gain linearity using gain compensation. Referring to FIGS. 5-6, the driver amplifier 620 can introduce gain expansion while the power amplifier (PA) 640, or the main power amplifier 640 and the auxiliary power amplifier 645 perform gain compression. The combined effects of the gain expansion and gain compression allow the multi-band linear amplifier circuit 512 to achieve gain linearity in a wide range of output power. Alternately, the driver amplifier 620 can introduce gain compression, if the power amplifier 140, or the main power amplifier 640 and the auxiliary power amplifier 645 perform gain expansion. The combined effects of the gain expansion and gain compression allow the multi-band linear amplifier circuit 512 to achieve gain linearity in a wide range of output power.

In some embodiments, the disclosed PA module and radio controller can improve gain linearity using phase compensation or correction. Referring to FIG. 6, the phase of the amplified signal of the power amplifying circuit 512 can vary over a range of the output power. Specifically the phase is shown to decrease with an increase in the output power. The phase control circuits 627 can produce phase-compensation signals that increase with the output power. The phase-compensation signals are respectively sent to the driver amplifier 620 to compensate the phase variations. Similarly, the phase of the amplified signal of the multi-band linear power amplifier circuit 512 can increase with an increase in the output power. The phase control circuit 627 can produce phase compensation signals that decrease with the output power. The phase compensation signals are respectively sent to the driver amplifier 620 to compensate the phase variations.

In some embodiments, the phase of the amplified signal from the multi-band linear power amplifier circuit 512 can both increase and decrease as a function of the output power. Phase compensation can be generated to dynamically compensate over each segment of the output power. The phase compensation can be dependent on the magnitude, the polarity, and the rate of change in the phase variations.

The driver amplifier 620 can also introduce gain expansion while the main power amplifier 640 and the auxiliary power amplifier 645, can perform gain compression. The combined effects of the gain expansion and gain compression allow the multi-band linear amplifier circuit 512 to achieve gain linearity in a wide range of output power. Alternately, the driver amplifier 620 can introduce gain compression while the main power amplifier 640 and the auxiliary power amplifier 645 can perform gain expansion. The combined effects of the gain expansion and gain compression allow the multi-band linear amplifier circuit 512 to achieve gain linearity in a wide range of output power.

Figure 7:
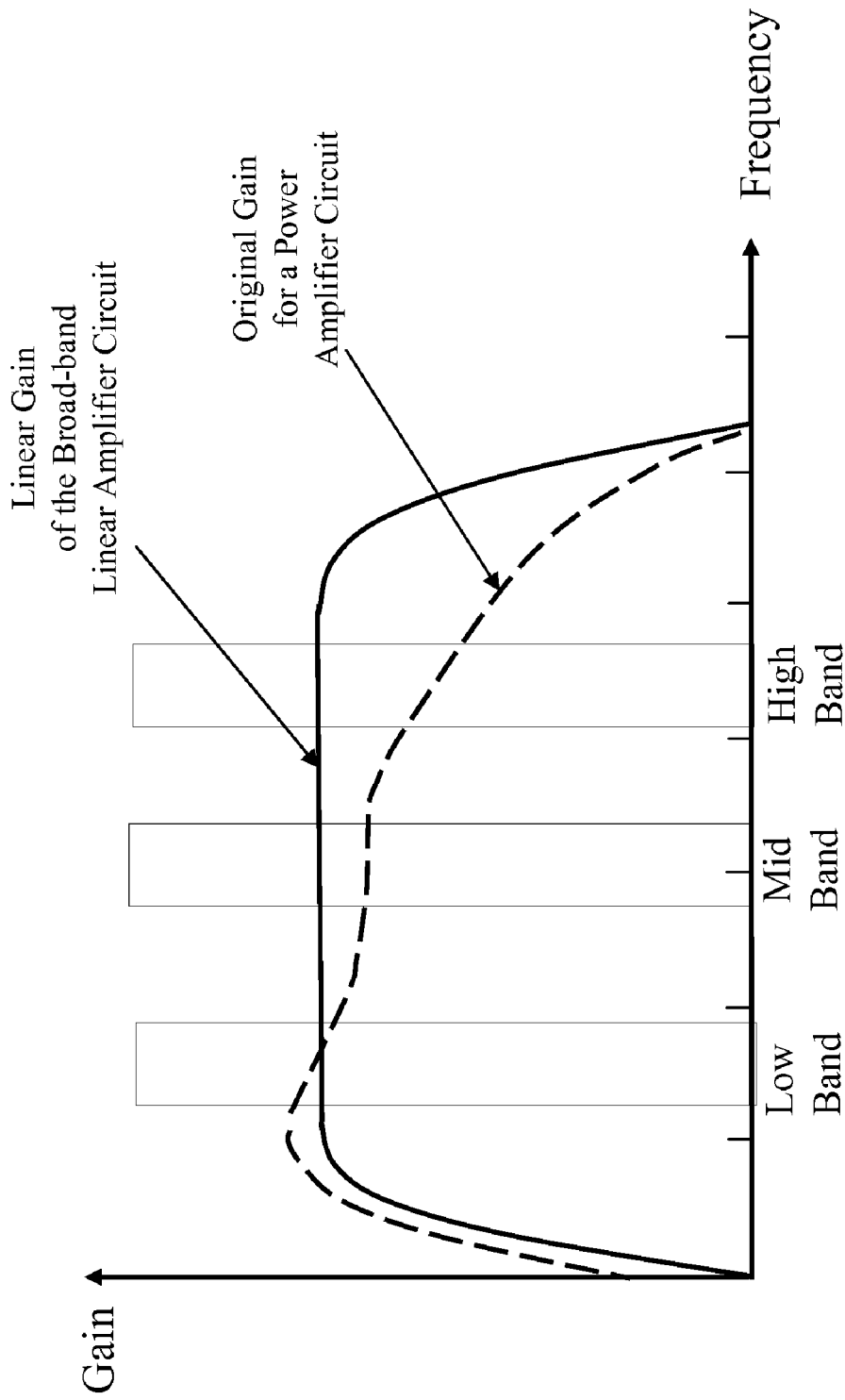
FIG. 7 illustrates band broadening by the exemplified multi-band linear amplifier circuit shown in FIG. 6.

The band broadening benefits of the multi-band linear amplifier circuit 512 is illustrated in FIG. 7. The gain curve in dashed line shows typical gain fall off with the increase of frequency. In particular, the gain responses at the lower frequency band and upper frequency band show great variations, with severely degraded gain linearity. The gain and phase controls implemented with power, gain and phase sensing in the above described multi-band linear amplifier circuit 512 can effectively flatten the gain response curve in the lower frequency band, mid frequency band and upper frequency band.

More details about a multi-band RF power amplifier module are disclosed in the commonly assigned pending U.S. patent application Ser. No. 12/263,112, titled "Broadband RF linear amplifier", filed Oct. 31, 2008, the content of which is incorporated herein by reference.

Figure 8:
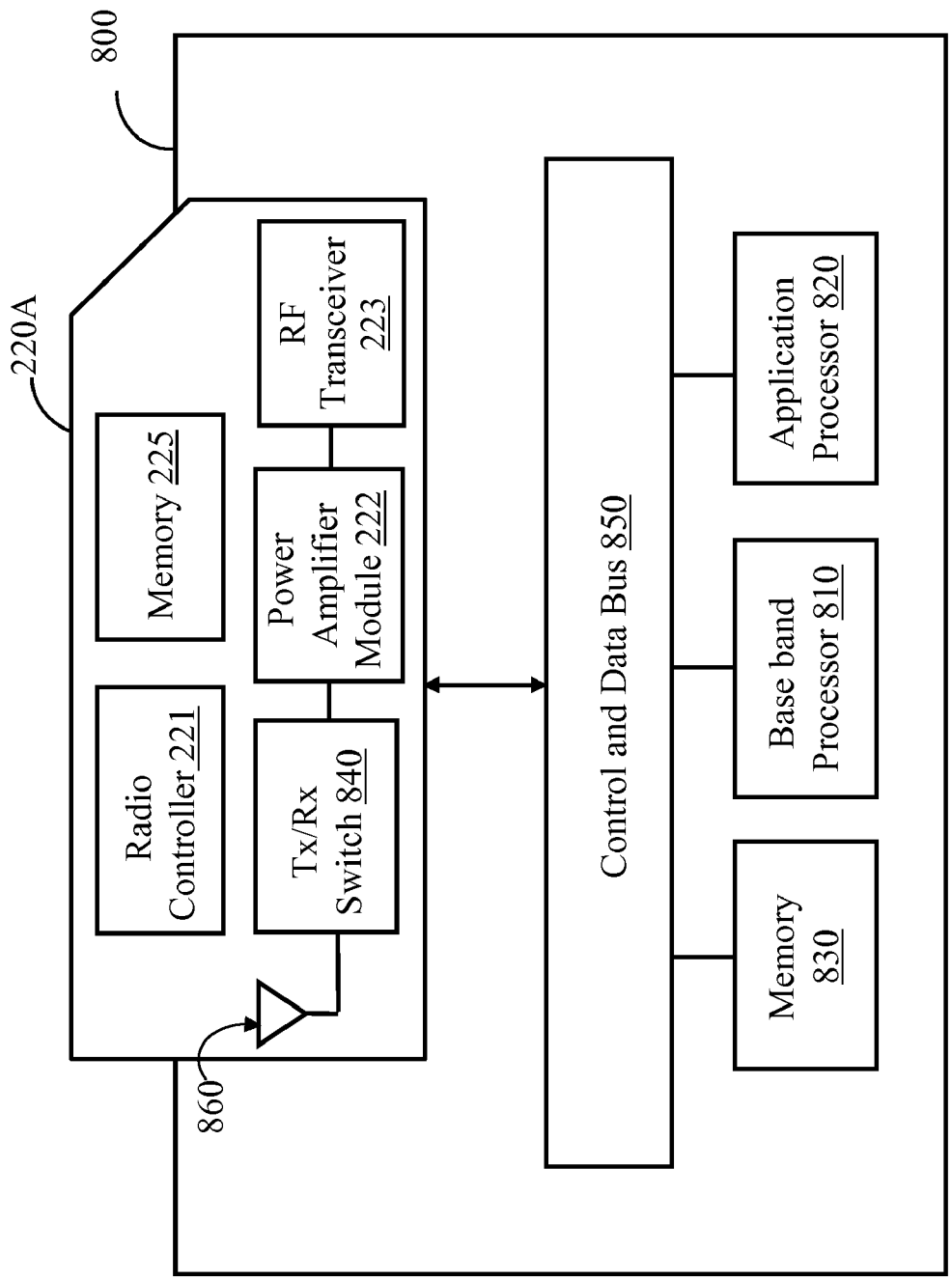
FIG. 8 is a block diagram for a configuration of a wireless device compatible with a universal radio card in accordance with the present invention.

The wireless device and its associated universal radio card can be implemented in different configurations. For example, FIG. 8 shows a wireless device 800 having a configuration similar to that of the wireless device 200 of FIGS. 2 and 3. The wireless device 800 includes in its host body a base band processor 810, an application processor 820, a memory 830, a transmission/reception (Tx/Rx) switch 840 for controlling the switching between the transmission and reception path, a control and data bus 850, and an antenna 860. (For simplicity reason, other detailed components shown in FIG. 3 are not repeated in FIG. 8) The compatible universal radio card 220A includes the radio controller 221, the power amplifier module 222, the RF transceiver 223, and the memory 225 as discussed in relation to FIGS. 2 and 3. In this configuration, the universal radio card 220A is required for the wireless device 800 to operate in any frequency band under any wireless standard. The wireless device 800 does not include an RF receiver and a power amplifier in its host body, and therefore cannot operate on its own.

Figure 9:
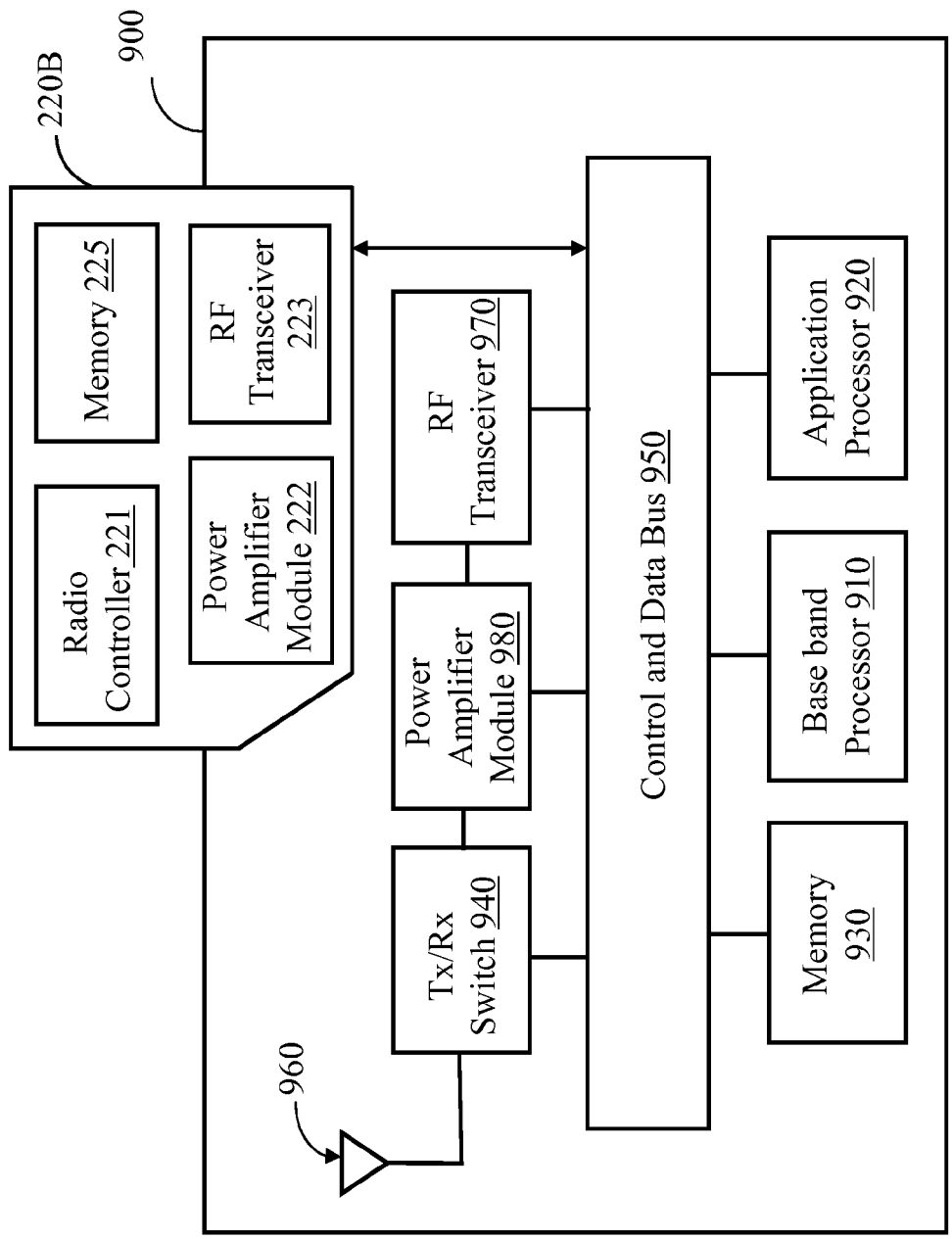
FIG. 9 is a block diagram for another configuration of a wireless device compatible with a universal radio card in accordance with the present invention.

In another configuration, as shown in FIG. 9, a wireless device 900 includes in its host body a base band processor 910, an application processor 920, a memory 930, transmission/reception (Tx/Rx) switch 940, a control and data bus 950, and an antenna 960. The compatible universal radio card 220B includes the radio controller 221, the power amplifier module 222, the RF transceiver 223, and the memory 225 as described in relation to FIGS. 2-4B, and 8. The wireless device 900 includes a power amplifier module 980 and an RF transceiver 970 which allow the wireless device 900 to operate under at least one native wireless standard. In other words, the wireless device 900 can operate in frequency bands defined in a native wireless standard without the universal radio card 220B plugged into the wireless device. The universal radio card 220B allows the wireless device 900 to extend its operation ranges to a broad range of other wireless standards.

Figure 10:
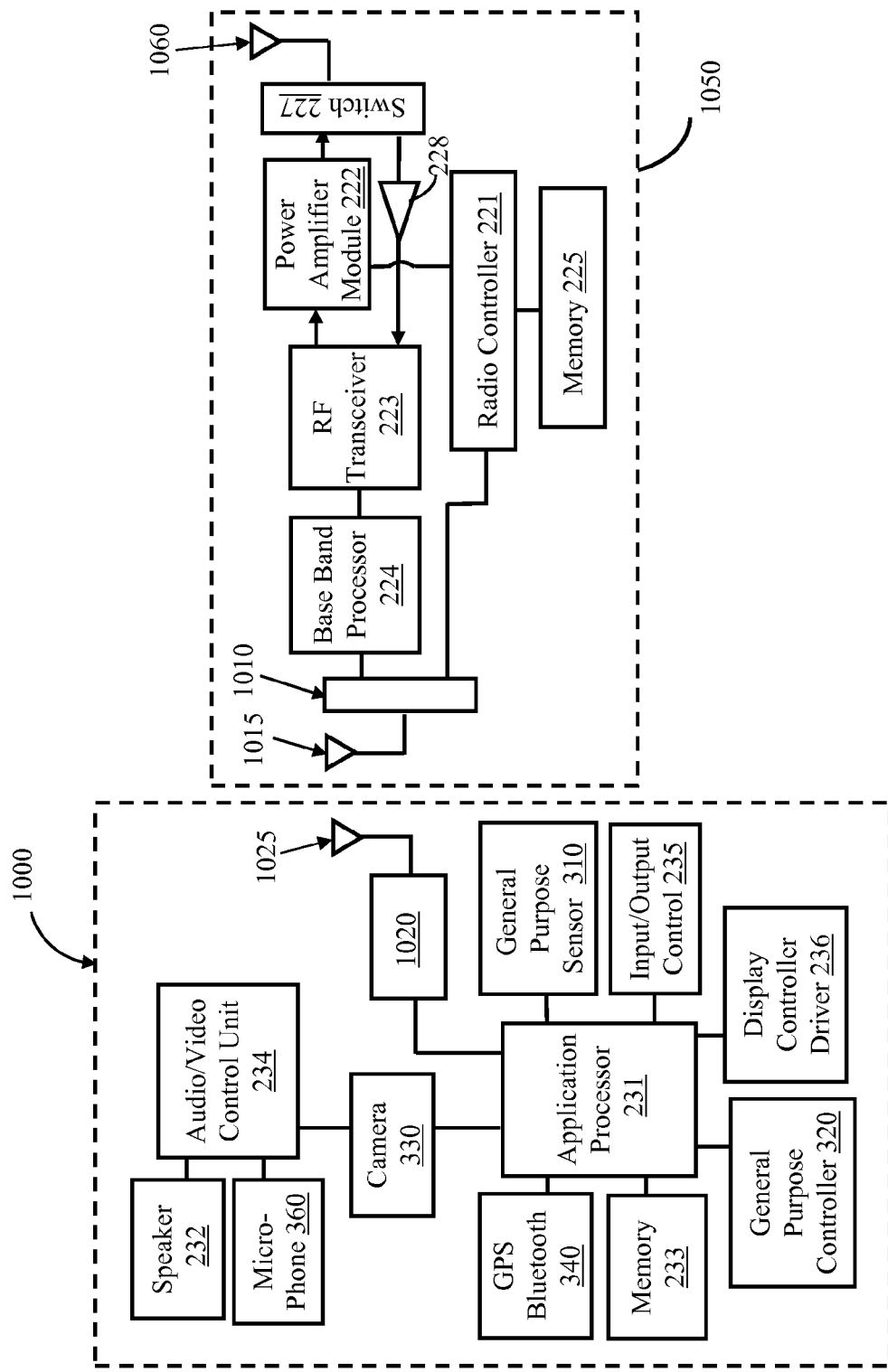
FIG. 10 is a detailed functional diagram for a wireless device and a universal radio card that is configured to be in short-range wireless communication with the wireless device.

In some embodiments, referring to FIG. 10, a wireless device 1000 include similar to components (e.g. 231-234, 310, 320, 330-336, 340, 360, etc.) to the wireless device 200. The radio card 1050 also includes similar components as the universal radio card 220. The communications between the wireless device 1000 and the universal radio card 1050 are not through the pairs of interfaces (238A and 227A, 238B and 227B). Instead, the wireless device 1000 and the universal radio card 1050 communicate wirelessly via a short range wireless network (personal wireless network). Examples of the short-range wireless network include Wi-Fi, blue tooth, wireless USB, Infrared, personal area network, personal area network (PAN, or Zigbee), etc.

The universal radio card 1050 includes a short-range wireless communication circuit 1010 for coding and decoding signals and an antenna 1015 for short range wireless communications with the wireless device 1000. The wireless device 1000 includes a short-range wireless communication circuit 1020 for coding and decoding signals and an antenna 1025 for short range wireless communications with the universal radio card 1050. The short-range wireless communications allow the universal radio card 1050 to be detached from the wireless device 1000 during normal operations. The universal radio card 1050 also includes a power source such as a compact battery.

In some implementations, an antenna 1060 is coupled to the output of the power amplifier module 222 in the universal radio card 1050 to provide wide-range (e.g. cellular) wireless communications with the base stations. Alternatively, an antenna (similar to antenna 240 in FIG. 3 but usually separate from the antenna 1025) can be provided in the wireless device 1000. The output signals from the power amplifier module 222 are first transmitted to the wireless device 1000 via a short-range wireless communication wherein the antenna in the wireless device transmits the output signals to the base stations.

The short-range wireless communications between the wireless device 1000 and the universal radio card 1050 allow the universal card 1050 to be separate from the wireless device 1000. For example, the universal radio card 1050 can be placed in a user's wallet while the wireless device 1000 is placed in the user's pocket. Anywhere within the range for short-range wireless communications, the universal card 1050 allows the wireless device 1000 always connected.

In some embodiments, a universal radio card 1050 can be in short-range wireless communication with a network of wireless devices which can include mobile phones or other types of wireless systems such as a gaming device or an electronic appliance.

It is understood that the disclosed multi-band wireless systems and universal radio cards can be compatible with other variations without deviating from the spirit of the present application. The universal radio card can be compatible with other removable card format than the examples described above. Furthermore, the disclosed multi-band wireless system can be compatible with one or more universal radio card(s) that each can allow the multi-band wireless system to operate under multiple wireless standards.

It is understood that the disclosed multi-band power amplifier module can operate in frequency ranges and RF bands different from the examples used in the specification. The multi-band filter can be implemented by different components and under different mechanism from the description above. The control of the multi-band filter can also be implemented other control circuit from the ones described above. Each power amplifier in the multi-band linear amplifier circuit can include more than three or more power amplifiers having different gain factors for amplifying RF signals in different output power ranges. Three or more power amplifiers can be arranged in a parallel circuit after a driver amplifier. The multi-band linear amplifier circuit can include one, or two, or more stages of power amplification. The gain and phase response curves and the output power ranges shown in disclosed figures are meant to be illustration purposes. The disclosed systems and methods are suitable to other gain and phase response characteristics in different power ranges.

The disclosed multi-band wireless systems and universal radio cards are suitable for different wireless modulation schemes such as Orthogonal Frequency-Division Multiplexing (OFDM) and Orthogonal Frequency-Division Multiplexing Access (OFDMA), and various wireless communications standards and protocols, including Global System for Mobile communications (GSM), Universal Mobile Telecommunications Service (UMTS) Code Division Multiple Access (CDMA). GSM can include GPRS, EDGE and CSD. UMTS can include Wideband Code Division Multiple Access (WCDMA), High-Speed Packet Access (HSPA), High-Speed Downlink Packet Access (HSDPA), UMTS-TDD, and Long Term Evolution (LTE). CDMA can include CDMA2000, and Ultra Mobile Broadband (UMB). Suitable wireless communications standards also include 3GPP, IMT-2000, WiMax, WiBro, WiFi, WLAN, 802.16, and others.

What is claimed is:

1. A multi-band wireless system, comprising:
   a wireless device comprising:
   an application processor configured to output a data signal;
   an antenna configured to transmit a wireless signal comprising a first amplified radio-frequency (RF) signal;
   a first electric interface in communication with the application processor;
   a second electric interface in communication with the antenna; and
   a detachable radio card configured to be mounted in contact with the first and second electric interfaces, the detachable radio card comprising:
   a base band processor configured to receive the data signal via the first electric interface from the application processor and to output a modulated signal;
   a radio-frequency (RF) transceiver configured to receive the modulated signal and output a first RF signal in a first frequency band or a second frequency band;
   a multi-band power amplifier module configured to amplify the first RF signal to produce the first amplified RF signal in the first frequency band or the second frequency band and to send the first amplified RF signal via the second electric interface to the antenna for wireless transmission via the antenna; and
   a radio controller configured to control the RF transceiver and the multi-band power amplifier module to select the first frequency band or the second frequency band, wherein the radio controller is configured to send a linearity control signal to the multi-band power amplifier module to control linearity of the first amplified RF signal.

2. The multi-band wireless system of claim 1, wherein the wireless device further comprises a sensor in communication with the application processor, wherein the sensor is configured to detect one or more of motion, acceleration, temperature, pressure, fluid-level, flow, position, proximity, rotation, stress/strain, vibration, chemical analysis, electric and magnetic field, electric current, voltage, capacitance, piezoelectricity, magneto-resistance, an optical signal, infrared photons, laser signals, a photonic signal, or an ultrasound signal.

3. The multi-band wireless system of claim 1, wherein the wireless device further comprises a controller in communication with the application processor, wherein the controller is configured to control a switch, a motor, or an actuator.

4. The multi-band wireless system of claim 1, wherein the wireless device further comprises an input/output controller in communication with the application processor, wherein the input/output controller is configured to control data input by a user and output to a user.

5. The multi-band wireless system of claim 1, wherein the wireless device further comprises a display controller driver in communication with the application processor, wherein the display controller driver is configured to enable a display to be viewed by a user.

6. The multi-band wireless system of claim 1, wherein the radio controller is configured to control a biasing circuit to adjust a biasing voltage in the multi-band power amplifier module.

7. The multi-band wireless system of claim 1, wherein the detachable radio card is compatible with the format of a Subscriber Identity Module (SIM) or Universal Integrated Circuit Card (UICC) or MicroSD card.

8. The multi-band wireless system of claim 1, wherein the detachable radio card further comprises:
   a multi-band filter comprising a first selectable narrow-band filter and a second selectable narrow-band filter, wherein the first selectable narrow-band filter is configured to pass the first amplified RF signal in the first frequency RF band, wherein the second selectable narrow-band filter is configured to pass the second amplified RF signal in the second frequency RF band.

9. The multi-band wireless system of claim 8, wherein the multi-band filter is configured to switch turn on one of the first selectable narrow-band filter or the second selectable narrow-band filter under the control of the radio controller.

10. The multi-band wireless system of claim 1, wherein the first frequency band and the second frequency band are defined by a wireless standard comprising Universal Mobile Telecommunications System (UMTS), WiMax, WiBro, WiFi, LTE, CDMA, or WCDMA.

11. The multi-band wireless system of claim 1, wherein the multi-band power amplifier module in the detachable radio card comprises:
   a power amplifier circuit configured to output the first amplified RF signal in response to a first biasing signal;
   a sensing circuit configured to sense at least one of a power, a gain, or a phase of the first amplified RF signal and to produce a sensing signal to be received by the radio controller;
   a first biasing circuit configured to produce the first bias signal under the control of the radio controller; and
   a control circuit under the control of the radio controller and configured to control gain variation or phase variation over a predetermined power range of the first amplified RF signal.

12. A multi-band wireless system, comprising:
   a wireless device comprising:
   an application processor configured to output a data signal;
   an antenna configured to transmit a wireless signal comprising a first amplified radio -frequency (RF) signal;
   a first electric interface in communication with the application processor; a second electric interface in communication with the antenna; and
   a detachable radio card configured to be mounted in contact with the first and second electric interfaces, the detachable radio card comprising:

a base band processor configured to receive the data signal via the electric interface from the application processor and to output a modulated signal;

a radio-frequency (RF) transceiver configured to receive the modulated signal and output a first RF signal in a first frequency band or a second frequency band;

a multi-band power amplifier module configured to amplify the first RF signal to produce the first amplified RF signal in the first frequency band or the second frequency band and to send the first amplified RF signal via the second electric interface to the antenna for wireless transmission via the antenna;

a multi-band filter comprising a first selectable narrow-band filter and a second selectable narrow-band filter, wherein the first selectable narrow-band filter is configured to pass the first amplified RF signal in the first frequency RF band, wherein the second selectable narrow-band filter is configured to pass the second amplified RF signal in the second frequency RF band; and a radio controller configured to control the RF transceiver, the multi-band power amplifier module, and the multi-band filter to select the first frequency band or the second frequency band, wherein the radio controller is configured to send a linearity control signal to the multi-band power amplifier module to control linearity of the first amplified RF signal.

13. The multi-band wireless system of claim 12, wherein the detachable radio card is compatible with the format of MicroSD card, or a Subscriber Identity Module (SIM) or Universal Integrated Circuit Card (UICC).

14. The multi-band wireless system of claim 12, wherein the wireless device further comprises a sensor in communication with the application processor, wherein the sensor is configured to detect one or more of motion, acceleration, temperature, pressure, fluid-level, flow, position, proximity, rotation, stress/strain, vibration, chemical analysis, electric and magnetic field, electric current, voltage, capacitance, piezoelectricity, magneto-resistance, an optical signal, infra-red photons, laser signals, a photonic signal, or an ultrasound signal.

15. The multi-band wireless system of claim 12, wherein the wireless device further comprises a controller in communication with the application processor, wherein the controller is configured to control a switch, a motor, or an actuator.

16. The multi-band wireless system of claim 12, wherein the radio controller is configured to control a biasing circuit to adjust a biasing voltage in the multi-band power amplifier module.

17. The multi-band wireless system of claim 12, wherein the wireless device further comprises a display controller driver in communication with the application processor, wherein the display controller driver is configured to enable a display to be viewed by a user.

18. The multi-band wireless system of claim 12, wherein the first frequency band and the second frequency band are defined by a wireless standard comprising Universal Mobile Telecommunications System (UMTS), WiMax, WiBro, WiFi, LTE, CDMA, or WCDMA.

19. A multi-band wireless system, comprising:

a wireless device, comprising:

an application processor configured to output a data signal; and a first antenna configured to transmit a short-range wireless signal in response to the data signal; and a radio card, comprising:

a second antenna configured to receive the short-range wireless signal;

a base band processor in communication with the second antenna, the base band processor being configured to output a modulated signal in response to the data signal extracted from the short-range wireless signal;

a radio-frequency (RF) transceiver configured to output a first RF signal in a first frequency band or a second frequency band in response to the modulated signal;

a multi-band power amplifier module configured to amplify the first RF signal and to produce a first amplified RF signal in the first frequency band or the second frequency band;

a radio controller configured to control the RF transceiver and the multi-band power amplifier module to select the first frequency band or the second frequency band, wherein the radio controller is configured to send a linearity control signal to the multi-band power amplifier module to control linearity of the first amplified RF signal; and a third antenna configured to transmit a wide-range wireless signal comprising the first amplified RF signal.

20. The multi-band wireless system of claim 19, wherein the wireless device further comprises a sensor in communication with the application processor, wherein the sensor is configured to detect one or more of motion, acceleration, temperature, pressure, fluid-level, flow, position, proximity, rotation, stress/strain, vibration, chemical analysis, electric and magnetic field, electric current, voltage, capacitance, piezoelectricity, magneto-resistance, an optical signal, infra-red photons, laser signals, a photonic signal, or an ultrasound signal.

21. The multi-band wireless system of claim 19, wherein the wireless device further comprises a controller in communication with the application processor, wherein the controller is configured to control a switch, a motor, or an actuator.

22. The multi-band wireless system of claim 19, wherein the radio controller is configured to control a biasing circuit to adjust a biasing voltage in the multi-band power amplifier module.

23. The multi-band wireless system of claim 19, wherein the wireless device further comprises a display controller driver in communication with the application processor, wherein the display controller driver is configured to enable a display to be viewed by a user.

24. The multi-band wireless system of claim 19, wherein the radio card and the wireless device are configured to communicate in a short-range wireless communication standard selected from the group consisting of Wi-Fi, blue tooth, wireless USB, Infrared, and personal area network.

25. The multi-band wireless system of claim 19, wherein the first frequency band and the second frequency band are defined by a wireless standard comprising Universal Mobile Telecommunications System (UMTS), WiMax, WiBro, WiFi, LTE, CDMA, or WCDMA.

* * * * *